(12) United States Patent
Park et al.

(10) Patent No.: US 11,704,621 B2
(45) Date of Patent: Jul. 18, 2023

(54) METHOD OF SENSING LOADED STATE AND ROBOT IMPLEMENTING THEREOF

(71) Applicant: LG Electronics Inc., Seoul (KR)

(72) Inventors: Younghwa Park, Seoul (KR); Sunuk Kim, Seoul (KR); Keunsik No, Seoul (KR); Iljae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 897 days.

(21) Appl. No.: 16/655,707

(22) Filed: Oct. 17, 2019

(65) Prior Publication Data

US 2020/0126039 A1  Apr. 23, 2020

Related U.S. Application Data

(60) Provisional application No. 62/747,136, filed on Oct. 18, 2018.

(30) Foreign Application Priority Data

Feb. 1, 2019 (KR) ........................ 10-2019-0013985

(51) Int. Cl.
*B25J 9/16* (2006.01)
*G06Q 10/0835* (2023.01)
(Continued)

(52) U.S. Cl.
CPC ......... *G06Q 10/08355* (2013.01); *B65G 1/06* (2013.01); *B65G 1/137* (2013.01);
(Continued)

(58) Field of Classification Search
CPC .......... G06Q 10/08; G07F 11/62; B65G 1/04; B65G 1/137; Y10S 901/46; Y10S 901/47
(Continued)

(56) References Cited

U.S. PATENT DOCUMENTS 6,505,093 B1 * 1/2003 Thatcher .............. B65G 1/1376
700/214
6,543,983 B1 * 4/2003 Felder .................. B23Q 7/1442
414/389

(Continued)

FOREIGN PATENT DOCUMENTS

EP          3142085 B1 *  3/2022 ............... B65G 1/04
KR       10-1513570 B1     4/2015
(Continued)

OTHER PUBLICATIONS

"Milestone report for SLAM" by Eysteinn Finnson et al., Milestone Journal Report of SLAM, Nov. 2014; pp. 1-6. (Year: 2014).*
(Continued)

*Primary Examiner* — Cuong H Nguyen
(74) *Attorney, Agent, or Firm* — Birch, Stewart, Kolasch & Birch, LLP

(57) ABSTRACT

A method of sensing a loaded state of articles in a storage bin and a robot implementing the method are provided. The robot senses a loaded state of articles received in the storage bin in real time or at regular intervals and includes the storage bin and storage bin sensors disposed outside the storage bin. The storage bin sensors are arranged at a non-parallel angle relative to a side surface of the storage bin.

20 Claims, 14 Drawing Sheets

(51) Int. Cl.
  *G06Q 10/0832* (2023.01)
  *G06Q 10/0833* (2023.01)
  *G05D 1/00* (2006.01)
  *B65G 1/137* (2006.01)
  *G05D 1/02* (2020.01)
  *B65G 1/06* (2006.01)
  *B65G 1/20* (2006.01)

(52) U.S. Cl.
  CPC .............. *B65G 1/20* (2013.01); *G05D 1/0088* (2013.01); *G05D 1/0238* (2013.01); *G05D 1/0274* (2013.01); *G06Q 10/0832* (2013.01); *G06Q 10/0833* (2013.01)

(58) Field of Classification Search
  USPC ................................ 705/338; 700/245; 701/1
  See application file for complete search history.

(56) References Cited

U.S. PATENT DOCUMENTS

| | | | | |
|---|---|---|---|---|
| 6,579,053 | B1* | 6/2003 | Grams | B65G 47/90 414/268 |
| 10,304,237 | B2* | 5/2019 | Sequeira | G01C 21/206 |
| 2003/0123970 | A1* | 7/2003 | Grams | B25J 15/10 414/807 |
| 2017/0322561 | A1* | 11/2017 | Stiernagle | G07F 11/62 |
| 2018/0282079 | A1* | 10/2018 | Heath | B25J 9/1697 |
| 2019/0224852 | A1* | 7/2019 | Choi | B25J 13/08 |
| 2019/0381667 | A1* | 12/2019 | Lee | B25J 9/162 |
| 2020/0023513 | A1* | 1/2020 | Ha | B25J 19/0054 |

FOREIGN PATENT DOCUMENTS

| | | | | |
|---|---|---|---|---|
| KR | 10-2018-0020755 A | | 2/2018 | |
| KR | 10-2018-0027792 A | | 3/2018 | |
| KR | 10-2018-0039977 A | | 4/2018 | |
| WO | WO-2018007065 A1 * | | 1/2018 | ............ B60W 30/06 |

OTHER PUBLICATIONS

M. Masuduzzaman, T. Rahim, A. Islam and S. Y. Shin, "UxV-based Deep-Learning Integrated Automated and Secure Garbage Management Scheme using Blockchain," in IEEE Internet of Things Journal, doi: 10.1109/JIOT.2022.3156617. (Year: 2022).*
A Human Support Robot for the Cleaning and Maintenance of Door Handles Using a Deep-Learning Framework by Balakrishnan Ramalingam et al; Sensors 2020, 20(12), 3543; https://doi.org/10.3390/s20123543. (Year: 2020).*

* cited by examiner

FIG. 3
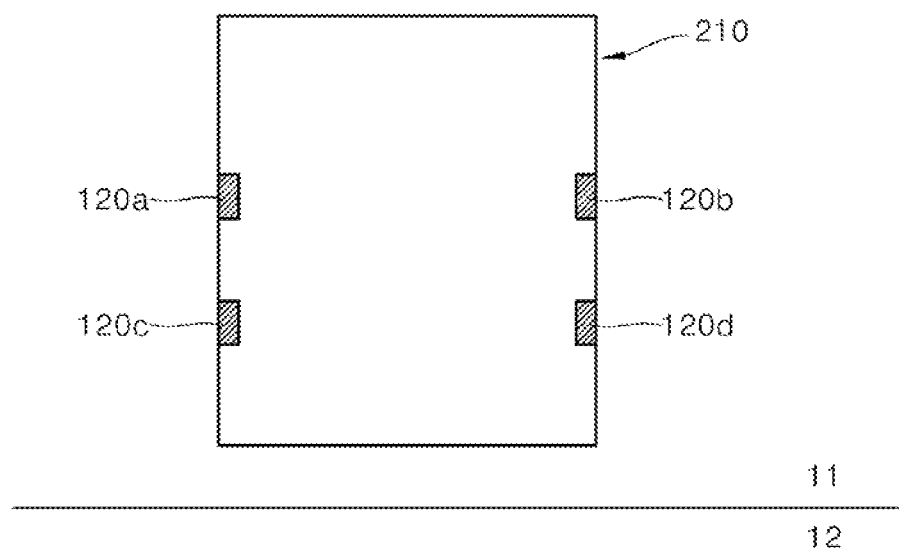
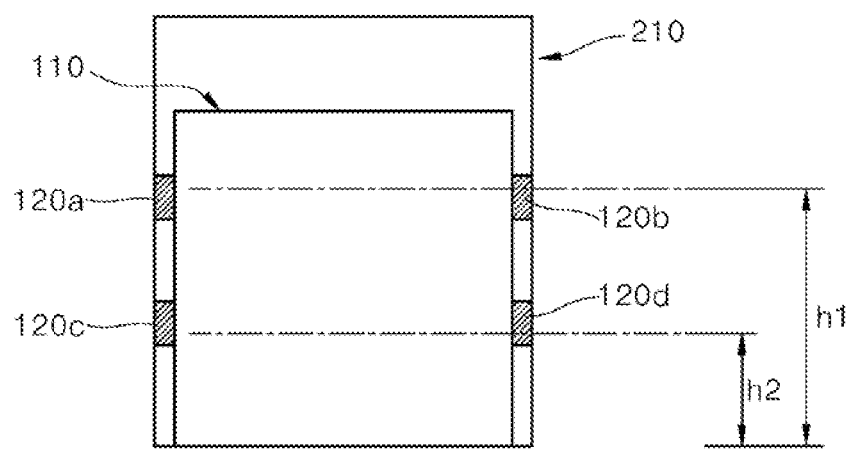

FIG. 4
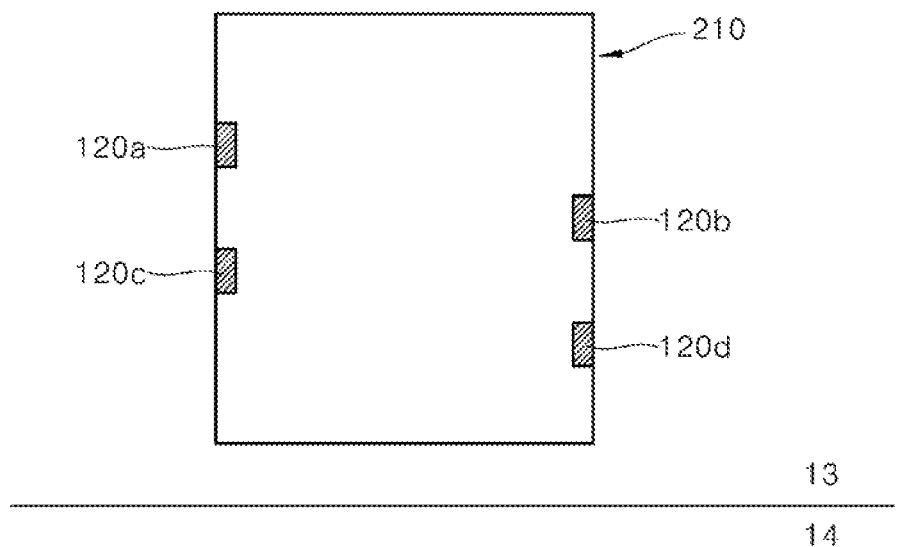
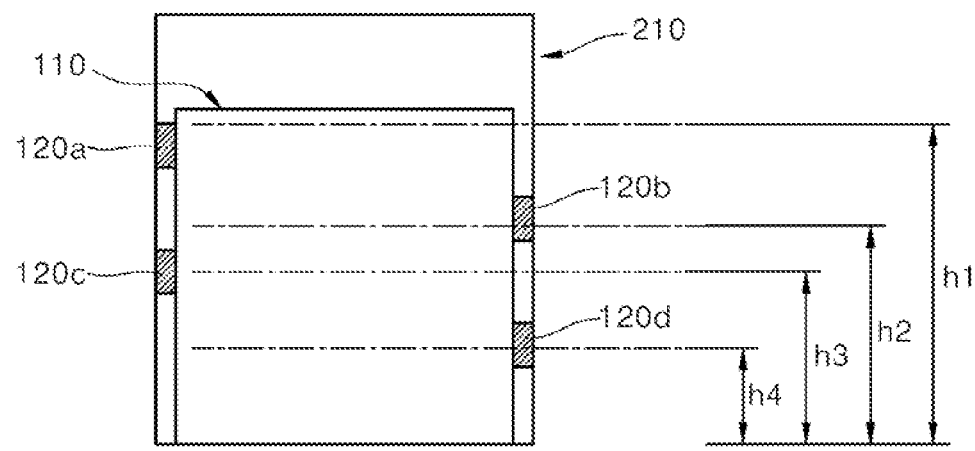

FIG. 8
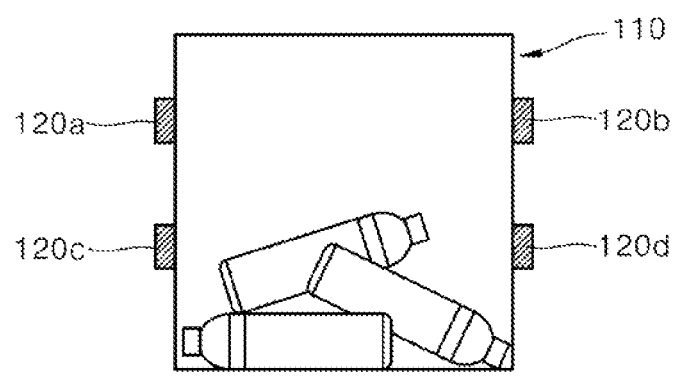
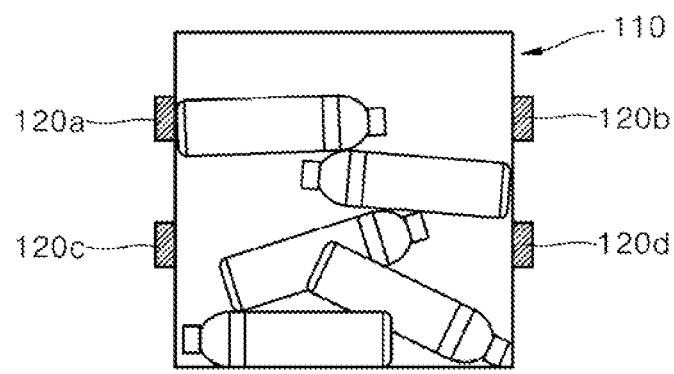

FIG. 10
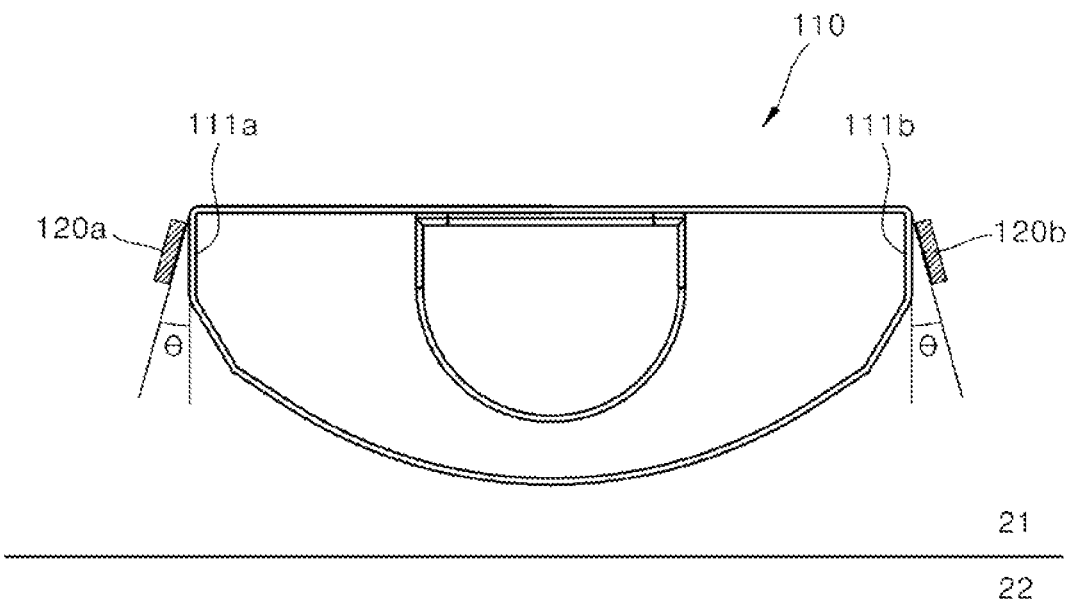
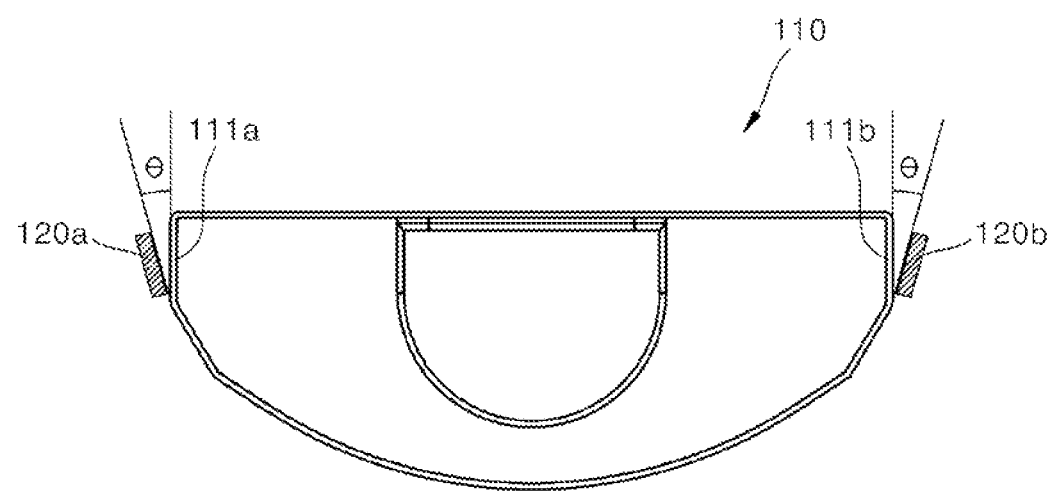

METHOD OF SENSING LOADED STATE AND ROBOT IMPLEMENTING THEREOF

CROSS-REFERENCE TO RELATED APPLICATION

This application claims priority under 35 U.S.C. § 119 to and the benefit of U.S. Provisional Application 62/747136, filed on Oct. 18, 2018, and Korean Patent Application No. 10-2019-0013985, filed on Feb. 1, 2019 and the disclosures of which are incorporated herein by reference in their entireties.

BACKGROUND

1. Field

An embodiment relates to a method of sensing a loaded state and a robot implementing thereof.

2. Background

Robots can provide various functions in spaces in which human and material exchanges occur actively, such as airports, schools, government offices, hotels, offices, factories, gymnasiums, and cultural facilities such as performance halls. In particular, a function of accommodating articles that should be inevitably thrown away while various users walk or perform tasks is a necessary function in a large space.

However, storage bins for articles are conventionally arranged at fixed positions. For example, wastebaskets are arranged at fixed positions. Further, bins for unauthorized items as belongings are also arranged at fixed positions in airports. Since storage bins of these various purpose are arranged at fixed positions, works for emptying or periodically collecting these storage bins are necessary.

In particular, in spaces in which many people move, such as airports, harbors, and train stations, areas in which people can move are wide, and, for convenience of users, management costs increase by arranging such storage bins in a large number. Thus, in the present disclosure, a method of engaging a robot with a storage bin for management of the storage bin will be described.

SUMMARY OF THE DISCLOSURE

The present disclosure is directed to a method of sensing an amount of objects in a storage bin coupled to a robot and a device for implementing the same.

The present disclosure is also directed to a robot which is capable of checking a loaded state, even when various objects are loaded in a storage bin, by arranging a sensor for sensing an amount of objects in the storage bin outside the storage bin.

The present disclosure is also directed to a robot which is capable of efficiently managing a storage bin by storing a loaded state of the storage bin, storing a location of the robot in a map and generating a moving path of the robot.

Objectives of the present invention are not limited to the above-described objectives, and other objectives and advantages of the present invention, which are not mentioned, can be understood by the following description and also will be apparently understood through embodiments of the present invention. It is also to be easily understood that the objectives and advantages of the present invention may be realized and attained by means and a combination thereof described in the appended claims.

According to an aspect of the present disclosure, there is provided a robot, which senses a loaded state of accommodated articles, including a storage bin configured to load articles which are put into from the outside and storage bin sensors disposed outside the storage bin and configured to sense the articles loaded in the storage bin by being disposed to form an angle not parallel to a side surface of the storage bin.

The robot may include a transmittance part configured to allow signals output from the storage bin sensors to be incident into the storage bin and disposed on the side surface of the storage bin.

The robot may further include a map storage configured to store position information on a space in which the robot moves and height variation information of the loaded articles, which is generated at a position at which the robot moves, and a controller of the robot may generate a moving path of the robot on the basis of a height of the articles loaded in the storage bin and the height variation information of the loaded articles for each position stored in the map storage.

According to another aspect of the present disclosure, there is provided a method of sensing a loaded state of accommodated articles, the method including sensing, by storage bin sensors of a robot, a signal output to a storage bin, checking, by a controller of the robot, an article loading height in the storage bin on the basis of the sensed signal, checking and storing, by the controller, a loading volume of the articles in the storage bin according to the article loading height, determining, by the controller, whether to replace the storage bin or remove the articles in the storage bin, and generating, by the controller, a moving path for replacement of the storage bin or removal of the articles in the storage bin.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 3 is a diagram illustrating configurations of a storage bin and a storage bin sensor according to one embodiment of the present disclosure;

FIG. 4 is a diagram illustrating configurations of a storage bin and a storage bin sensor according to another embodiment of the present disclosure;

FIG. 8 is a diagram illustrating a result of sensing the storage bin in which articles are accommodated according to one embodiment of the present disclosure;

FIG. 10 is a diagram illustrating a configuration in which a sensor is disposed to have a predetermined angle according to one embodiment of the present disclosure;

DETAILED DESCRIPTION

Figure 1:
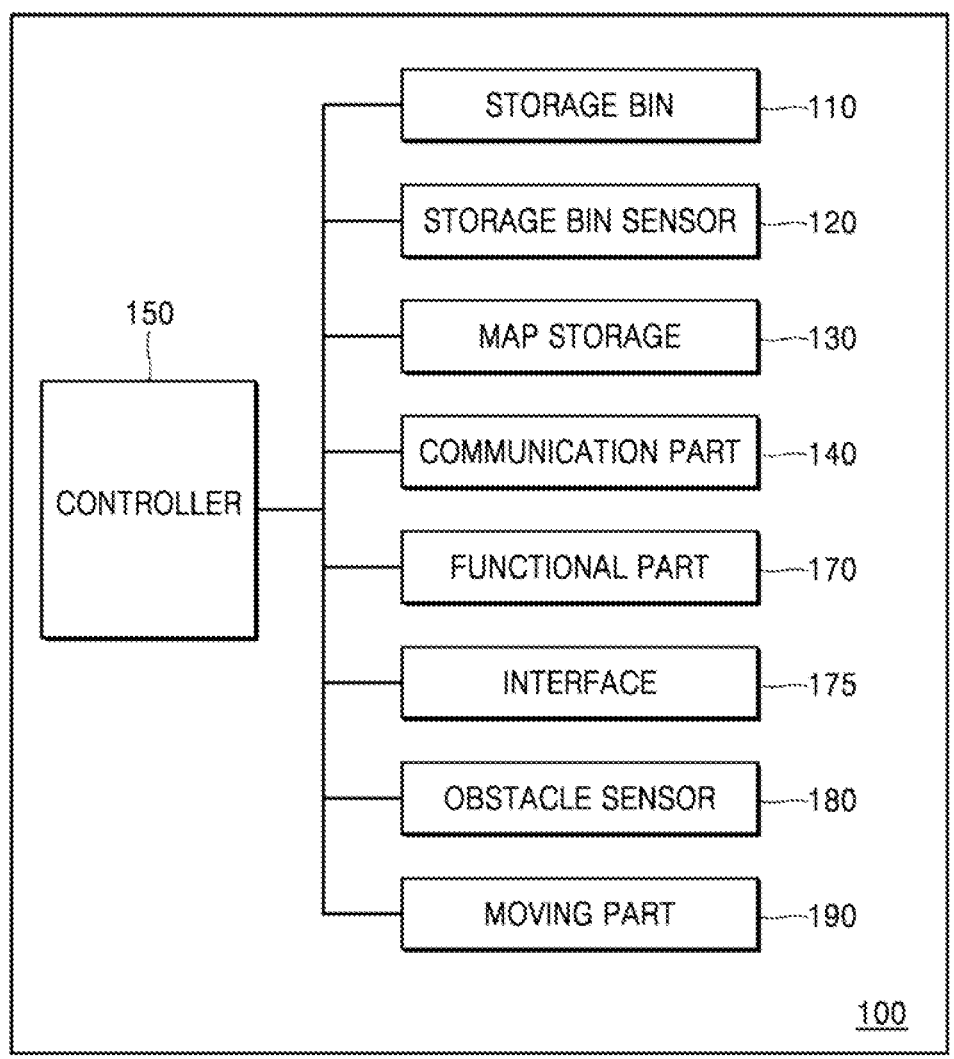
FIG. 1 is a diagram illustrating a configuration of a robot according to one embodiment of the present disclosure.

Embodiments of the present disclosure will be fully described in detail below to be easily practiced by those skilled in the art to which is the present disclosure pertains with reference to the accompanying drawings. The present disclosure may be implemented in various different forms, and thus it is not limited to embodiments which will be described herein.

In order to clearly describe the present disclosure, some portions not related to the description will be omitted and not be shown, and the same reference numerals are given to the same or similar components throughout this disclosure. Further, some embodiments of the present disclosure will be described in detail with reference to the illustrative drawings. In giving reference numerals to components of the drawings, the same reference numerals may be given to the same components even though the same components are shown in different drawings. Further, in the following description of the present disclosure, if a detailed description of related known configurations or functions is determined to obscure the gist of the present disclosure, the detailed description thereof will be omitted.

In describing components of the present disclosure, terms a first, a second, A, B, (a), (b), and the like can be used. These terms are intended to distinguish one component from other components, but the nature, sequence, order, or number of the components is not limited by those terms. When components are disclosed as being "connected," "coupled," or "contacted" to other components, the components can be directly connected or contacted to the other components, but it should be understood that another component(s) could be "interposed" between the components and the other components or could be "connected," "coupled," or "contacted" therebetween.

For convenience of description, in implementing the present disclosure, components can be described by being segmented. However, these components can be implemented in a single device or module, or a single component can be implemented by being segmented into a plurality of devices or modules.

Hereinafter, in this disclosure, a robot means a device in which a storage bin of a specific purpose is mounted and which moves. An appearance of the robot does not necessarily have a humanoid robot, and a movable device in which a storage bin is mountably and replaceably engaged is referred to herein as the robot.

Further, in this disclosure, the robot may also provide functions including cleaning, security, monitoring, and guidance and move while providing various functions according to characteristics of a space in which the robot moves. Therefore, the robot in this disclosure is a device with which a storage bin is engageable and is collectively referred to as a device which has a moving part that is movable in a space using a predetermined sensor and provides a predetermined function.

In this disclosure, the robot may move while having a map. The map means information on fixed walls, stairs, and the like which are verified as not moving in a space. Further, the robot may separately dynamically store information on a storage bin on the map. For example, information regarding that a lot of articles are accumulatively put into a storage bin in a specific area may be stored together with position information. When a moving path of the robot, in which a storage bin is disposed, is generated, the above-described information may be used.

In the present disclosure, the storage bin means a device which is attachable to and detachable from the robot and, like a wastebasket or a storage box, the storage bin provides a function of temporarily storing an article, which will be accommodated or disused, according to functions thereof.

FIG. 1 illustrates a configuration of a robot according to one embodiment of the present disclosure. A controller 150 checks movement of a robot 100 and an article storage state of a storage bin 110. The controller 150 controls components in the robot 100 and determines whether to replace the storage bin 110 according to a height of articles in the storage bin 110, which is sensed by a storage bin sensor 120.

Further, in addition to the height of the articles, the controller 150 may calculate a volume of the articles by vertically arranging two or more storage bin sensors 120. The storage bin 110 loads articles input from the outside.

The storage bin sensor 120 is disposed outside the storage bin 110 and senses the article storage state in the storage bin 110. In particular, the storage bin sensor 120 is disposed to form an angle that is not parallel to a side surface of the storage bin 110 to solve a problem in that a signal output from the storage bin sensor 120 is directly reflected from the storage bin 110 so that the output signal is not incident into the storage bin 110.

The storage bin sensor 120 is disposed outside the storage bin 110. A map storage 130 stores position information as the robot 100 moves. A communication part 140 transmits and receives information to and from another robot 100 or a central server controlling robots.

A functional part 170 means to provide a specialized function of the robot 100. For example, in the case of a cleaning robot, the functional part 170 includes components required for cleaning. In the case of a guide robot, the functional part 170 includes components required for guidance. In the case of a security robot, the functional part 170 includes components required for security. The functional part 170 may include various components according to functions provided by the robot 100, and the present disclosure is not limited thereto.

An interface 175 is a component that outputs visual information or audio information or receives a voice input or a touch input from a user. One or more interfaces 175, such as a first interface 175a and a second interface 17b1, may be disposed in the robot 100.

Further, the interface 175 may output a loaded state of the storage bin 110 under the control of the controller 150. Further, when a user approaches the robot 100, the interface 175 may output a guide speech according to the loaded state.

An obstacle sensor 180 provides sensing information to allow the robot 100 to sense an object located outside the robot 100 while the robot 100 moves. The obstacle sensor 180 includes an infrared sensor, an ultrasonic sensor, a depth sensor, and the like.

A moving part 190 is a part for providing a function of moving the robot 100, such as a wheel and includes a wheel, a caterpillar, and the like. The moving part 190 moves the robot 100 under the control of the controller 150. In this case, the controller 150 may check a current position of the robot 100 in an area stored in the map storage 130 and provide a moving signal to the moving part 190.

The storage bin sensor 120 is mounted in the robot 100 to sense whether the storage bin 110 is engaged with the robot 100 and sense an accommodated state (amount) of articles in the storage bin 110. For example, the storage bin sensor 120 includes a time of flight (ToF) sensor as one embodiment. The ToF sensor senses an amount of articles in the storage bin 110 in real time or at regular intervals.

In particular, the storage bin sensor 120 may be mounted in the robot 100 and may be disposed outside the storage bin 110 so as to allow only the storage bin 110 to be replaced. The storage bin sensor 120 includes a light emitting part and a light receiving part for transmitting and receiving laser light. Further, the storage bin 110 may be made of a transparent material so as to allow the laser light to be transmitted and received between the light emitting part and the light receiving part.

The controller 150 may determine an amount of articles in the storage bin 110 through a time difference between transmitted and received laser lights sensed by the storage bin sensor 120. In particular, in the present disclosure, the storage bin sensor 120 may be disposed on the side surface of the storage bin 110 instead of a top surface of the storage bin 110 so that an amount of accommodated articles may be accurately checked in real time or at regular intervals while the articles are accumulated from a lower end portion of the storage bin 110.

Further, the storage bin sensor 120 may sense an article made of a transparent material, such as a water bottle. Consequently, the robot 100 may accurately sense the amount of the articles in the storage bin 110 to replace the storage bin 110, and a moving path of the robot 100 for replacement of the storage bin 110 may also be efficiently generated.

Figure 2:
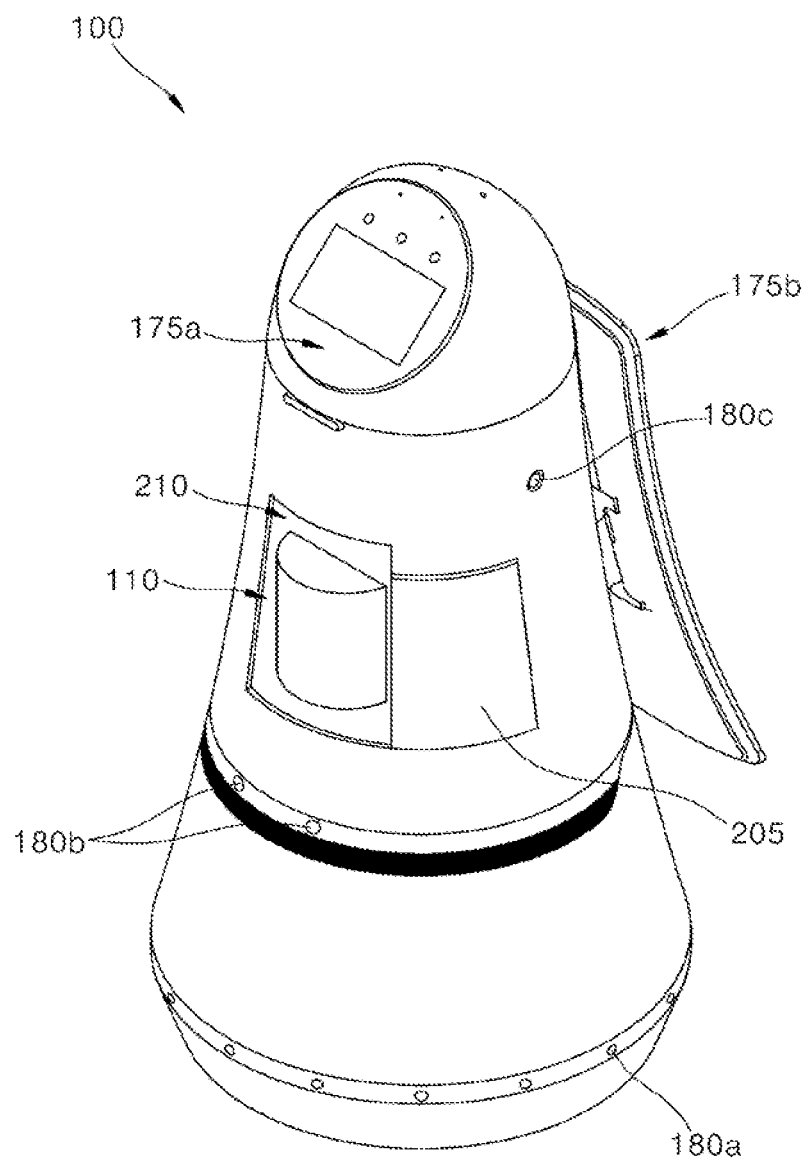
FIG. 2 is a diagram illustrating an appearance of a robot 100 according to one embodiment of the present disclosure.

FIG. 2 illustrates an appearance of a robot 100 according to one embodiment of the present disclosure. The appearance of the robot 100 may be variously arranged, and the robot 100 further includes a storage bin engagement part 210 that is a recessed area in which the storage bin 110 is engageable. Thus, the storage bin 110 is seated in the storage bin engagement part 210.

The storage bin engagement part 210 is a space in which the storage bin 110 may be mounted. The storage bin engagement part 210 may be disposed in a recessed shape in the robot 100. Unlike FIG. 2, the storage bin engagement part 210 may be disposed in a protruding shape outside the robot 100. An appearance of the storage bin engagement part 210 may be variously formed along with an appearance of the storage bin 110, and the present disclosure is not limited to the configuration of FIG. 2.

A separate door 205 may be disposed in the storage bin engagement part 210 to cover a portion or an entirety of the storage bin 110. As shown in FIG. 2, when a height of the door 205 covers the portion of the storage bin 110 instead of covering the entirety thereof, users may put articles into an area in which the door 205 is not disposed.

A plurality of obstacle sensors 180*a*, 180*b*, and 180*c* are disposed in the robot 100 of FIG. 2 so that the robot 100 may avoid obstacles.

FIG. 3 illustrates configurations of a storage bin and a storage bin sensor according to one embodiment of the present disclosure.

A diagram 11 shows a configuration in which a plurality of storage bin sensors 120*a*, 120*b*, 120*c*, and 120*d* are disposed in the storage bin engagement part 210. A diagram 12 shows the storage bin 110 disposed in the storage bin engagement part 210.

The plurality of storage bin sensors 120*a*, 120*b*, 120*c*, and 120*d* may be disposed on side surfaces of the storage bin 110 to sense a loaded state of articles in the storage bin 110. In one example, the storage bin 110 may be made of a transparent material, and signals output from the storage bin sensors 120*a*, 120*b*, 120*c*, and 120*d* may pass through the storage bin 110.

In one example, each of the storage bin sensors 120*a*, 120*b*, 120*c*, and 120*d* may include a pair of a light emitting part and a light receiving part. In this case, when the signal output from the storage bin sensor 120*a* is reflected from articles in the storage bin 110 and then input to the storage bin sensor 120*a* again, the controller 150 determines that the articles are loaded at a height h1. The above-described embodiment is also applied to the storage bin sensor 120*b*.

Likewise, when the signal output from the storage bin sensor 120*c* is reflected from articles in the storage bin 110 and then input to the storage bin sensor 120*c* again, the controller 150 determines that the articles are loaded at a height h2. The above-described embodiment is also applied to the storage bin sensor 120*d*.

In the structure as shown in FIG. 3, a time at which each sensor outputs a signal may be differently controlled so that a signal output from each sensor is not input to an opposite sensor. For example, the controller 150 controls times at which the storage bin sensors 120*a* and 120*c* output signals to be different from those at which the storage bin sensors 120*b* and 120*d* output signals. Thus, even when the signal output from the storage bin sensor 120*a* is input to the storage bin sensor 120*b*, the controller 150 is controlled not to determine that the signal output from the storage bin sensor 120*a* is a signal reflected from the articles.

Meanwhile, as another example of the configuration of FIG. 3, the storage bin sensors 120*a*, 120*b*, 120*c*, and 120*d* may constitute pairs of light emitting parts and light receiving parts in a horizontal direction. For example, when the storage bin sensors 120*a* and 120*b* are respectively constituted as a light emitting part and a light receiving part and the signal output from the storage bin sensor 120*a* is input to the storage bin sensor 120*b*, the controller 150 determines that the articles are not loaded to the height h1.

Likewise, when the storage bin sensors 120*c* and 120*d* are respectively constituted as a light emitting part and a light receiving part and the signal output from the storage bin sensor 120*c* is input to the storage bin sensor 120*d*, the controller 150 determines that the articles are not loaded to the height h2. When the signal is not input or strength of the signal is weak, the controller 150 determines that the articles are loaded to a specific height.

FIG. 4 illustrates configurations of a storage bin and a storage bin sensor according to another embodiment of the present disclosure. A diagram 13 shows a configuration in which a storage bin engagement part 210 and storage bin sensors 120*a*, 120*b*, 120*c*, and 120*d* are disposed, and the storage bin sensors 120*a*, 120*b*, 120*c*, and 120*d* are disposed at different heights.

FIG. 4 illustrates an embodiment in which each of the storage bin sensors 120*a*, 120*b*, 120*c*, and 120*d* includes a pair of a light emitting part and a light receiving part. In this case, an interior of the storage bin engagement part 210 may be made of a material which does not reflect a signal.

In a diagram 14, when the storage bin sensor 120a includes both a light emitting part and a light receiving part and a signal output from the light emitting part of the storage bin sensor 120a is reflected from articles loaded in a storage bin 110, the light receiving part of the storage bin sensor 120a receives the signal, and the controller 150 determines that the articles are loaded to a height h1.

The controller 150 determines that the articles are loaded to a height h2 using the storage bin sensor 120b. The controller 150 determines that the articles are loaded to a height h3 using the storage bin sensor 120c. The controller 150 determines that the articles are loaded to a height h4 using the storage bin sensor 120d.

When the articles are not loaded at any one among the heights h1 to h4, the signal reaches a wall surface of the storage bin engagement part 210 and is then absorbed by a surface of the storage bin engagement part 210. Consequently, the reflected signal is not input to the light receiving parts of the storage bin sensors 120a, 120b, 120c, and 120d. In this case, the controller 150 determines that the articles are not loaded at a specific height among the heights h1 to h4.

FIGS. 3 and 4 illustrate that a plurality of storage bin sensors are vertically disposed at a first height h1 and a second height h2 in the storage bin engagement part 210. Due to a height difference between the storage bin sensors, the controller 150 may check a loaded state (a height and a volume) of the articles loaded in the storage bin using signals sensed by the storage bin sensors.

The height of the loaded articles may be checked using the signals sensed by the storage bin sensors, and the loaded state of the articles may be checked using distance information in the sensed signals. Further, when a weight sensor is additionally disposed at a lower end of the storage bin 110, the controller 150 may check weight information of the loaded articles.

Figure 5:
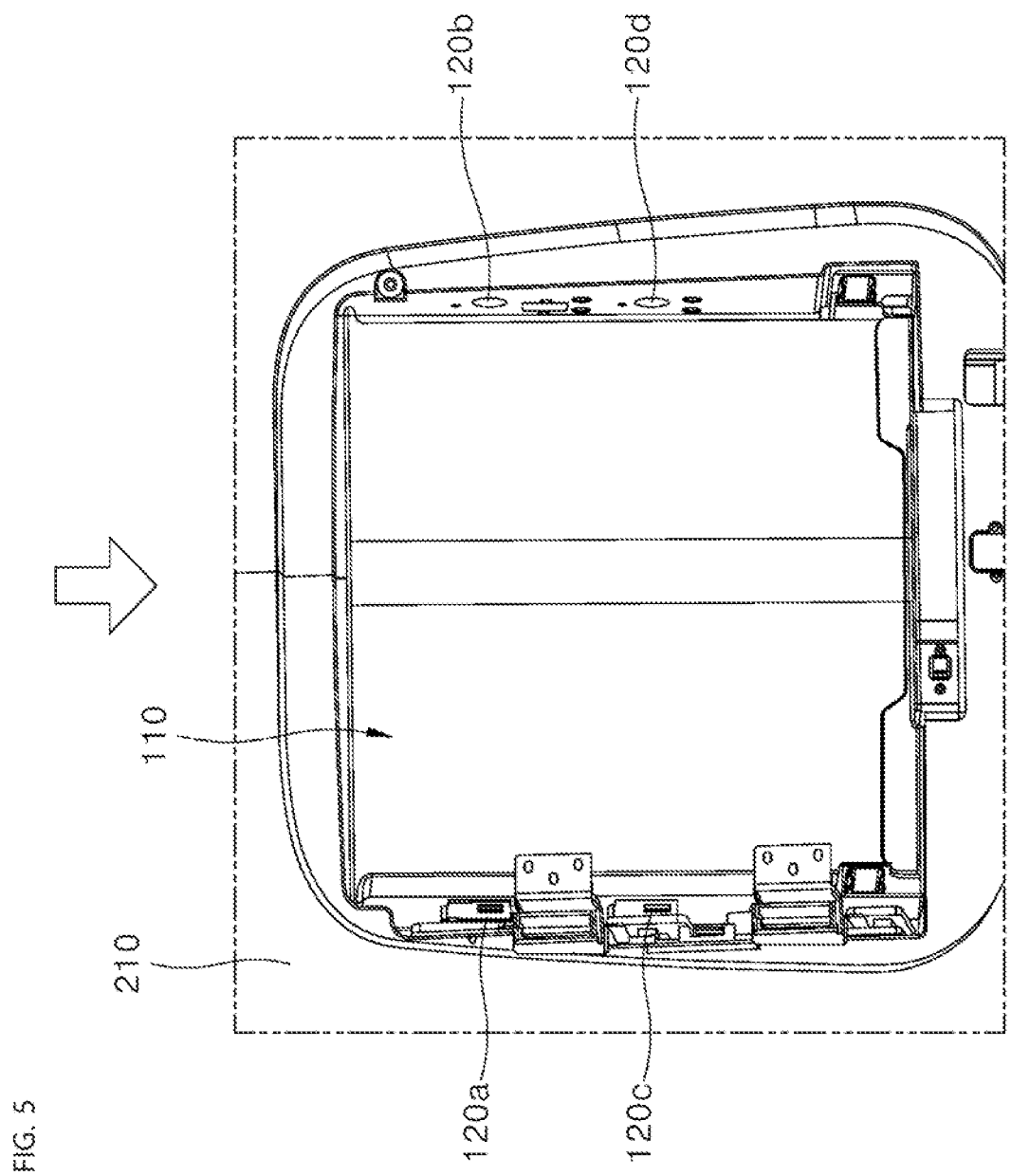
FIGS. 5 and 6 are diagrams illustrating a configuration in which the storage bin according to one embodiment of the present disclosure is disposed.
Figure 6:
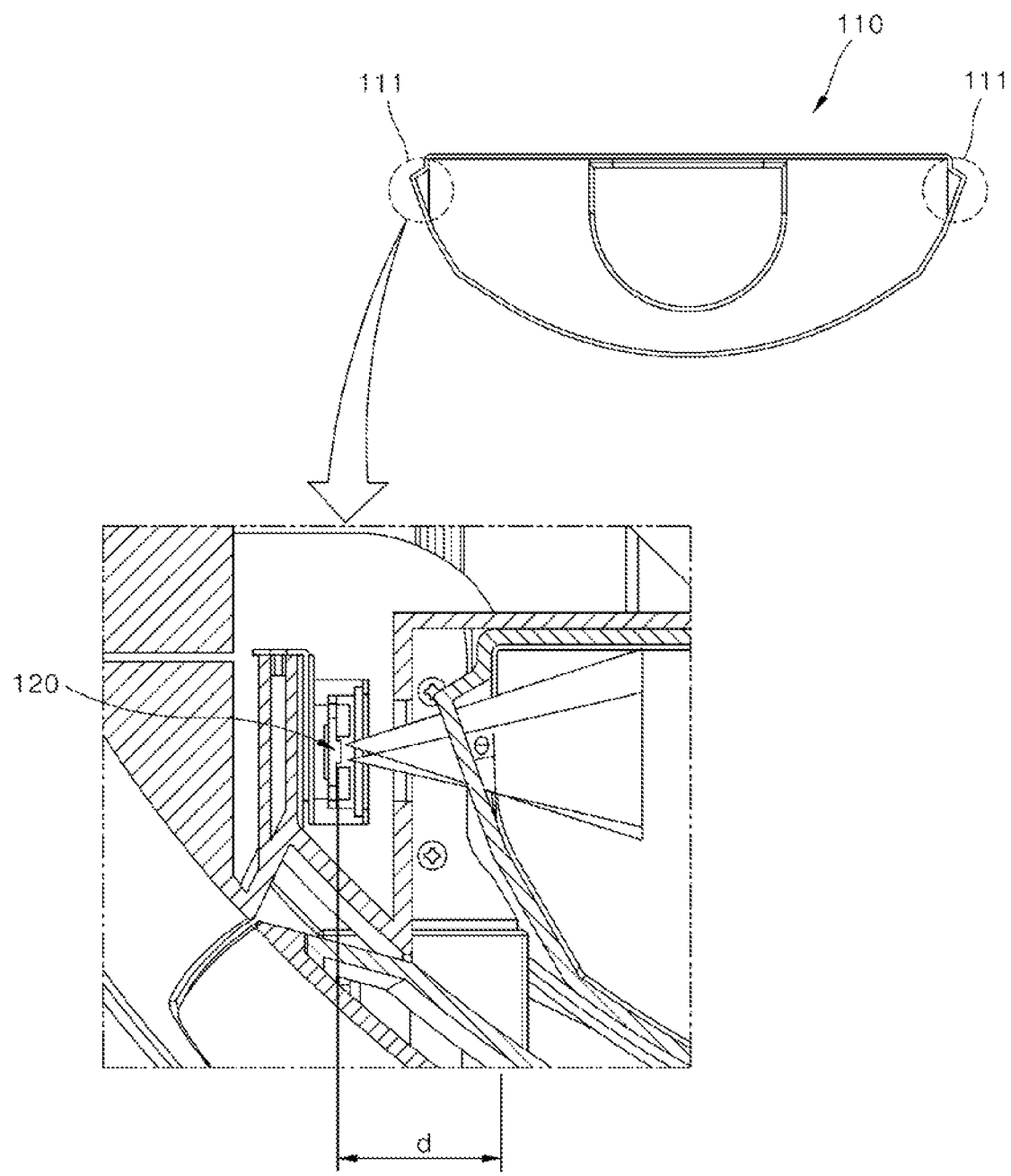

FIGS. 5 and 6 illustrate a configuration in which the storage bin according to one embodiment of the present disclosure is disposed. The storage bin engagement part 210, the storage bin sensors 120a, 120b, 120c, and 120d, and the storage bin 110 may be implemented in various shapes. FIG. 5 illustrates a configuration in which four storage bin sensors 120a, 120b, 120c, and 120d are disposed in the storage bin engagement part 210 and the storage bin 110 is disposed in contact with the four storage bin sensors 120a, 120b, 120c, and 120d.

The storage bin sensors 120a, 120b, 120c, and 120d may be disposed outside the storage bin 110 such that sensing accuracy of each of the storage bin sensors 120a, 120b, 120c, and 120d may be improved. A configuration of the storage bin 110 will be described in an arrow direction of FIG. 5.

Transmittance parts 111 are formed to correspond to positions of the sensors on an outer side surface of the storage bin 110 of FIG. 6. The transmittance part 111 allows a signal output from the storage bin sensor 120 to be incident into the storage bin 110. Further, the signal reflected from articles in the storage bin 110 also passes through the transmittance part 111 and is input to the storage bin sensor 120 again. That is, the transmittance part 111 allows the signal output from the storage bin sensor 120 to pass through the transmittance part 111 or allows the signal to be incident into the storage bin sensor 120.

Further, the storage bin sensor 120 and the transmittance part 111 may not be in parallel with each other and may maintain an angle within 30 degrees. As shown in FIG. 6, the transmittance part 111 may be disposed in a protruding shape. Further, as described below with reference to FIG. 10, the storage bin 110 and the storage bin sensor 120 may be disposed such that an angle between a side surface of the storage bin 110 and the storage bin sensor 120 has a non-parallel angle.

When the transmittance part 111 is not formed and an angle θ between the storage bin 110 and the storage bin sensor 120 is zero degree (0°), an error may occur due to direct reflection of a signal during measurement of the articles. Further, the transmittance part 111 may be made of a transparent material.

For example, an entirety of the storage bin 110 may be made of a transparent material. Consequently, the transmittance part 111 may also be made of a transparent material. Alternatively, an area of the storage bin 110 except for the transmittance part 111 may be made of an opaque material, and only the transmittance part 111 may be made of a transparent material.

Therefore, the embodiment of the present disclosure may constitute an angle between the storage bin sensor 120 and the transmittance part 111, which are at both end portions of the storage bin 110, as an angle that is greater than zero degree and less than 90 degrees to sense an actual distance between articles. In an example, the angle between the transmittance part 111 and the storage bin sensor 120 may be set to a range of 20° to 30°.

Further, in FIG. 6, a distance d between the transmittance part 111 of the storage bin 110 and the storage bin sensor 120 may also be adjusted. The distance d may be adjusted according to a signal characteristic of the sensor, a material of the transmittance part 111, the angle θ, and the like. For example, the distance d may range from 17 mm and 23 mm, but the present disclosure is not limited thereto.

Figure 7:
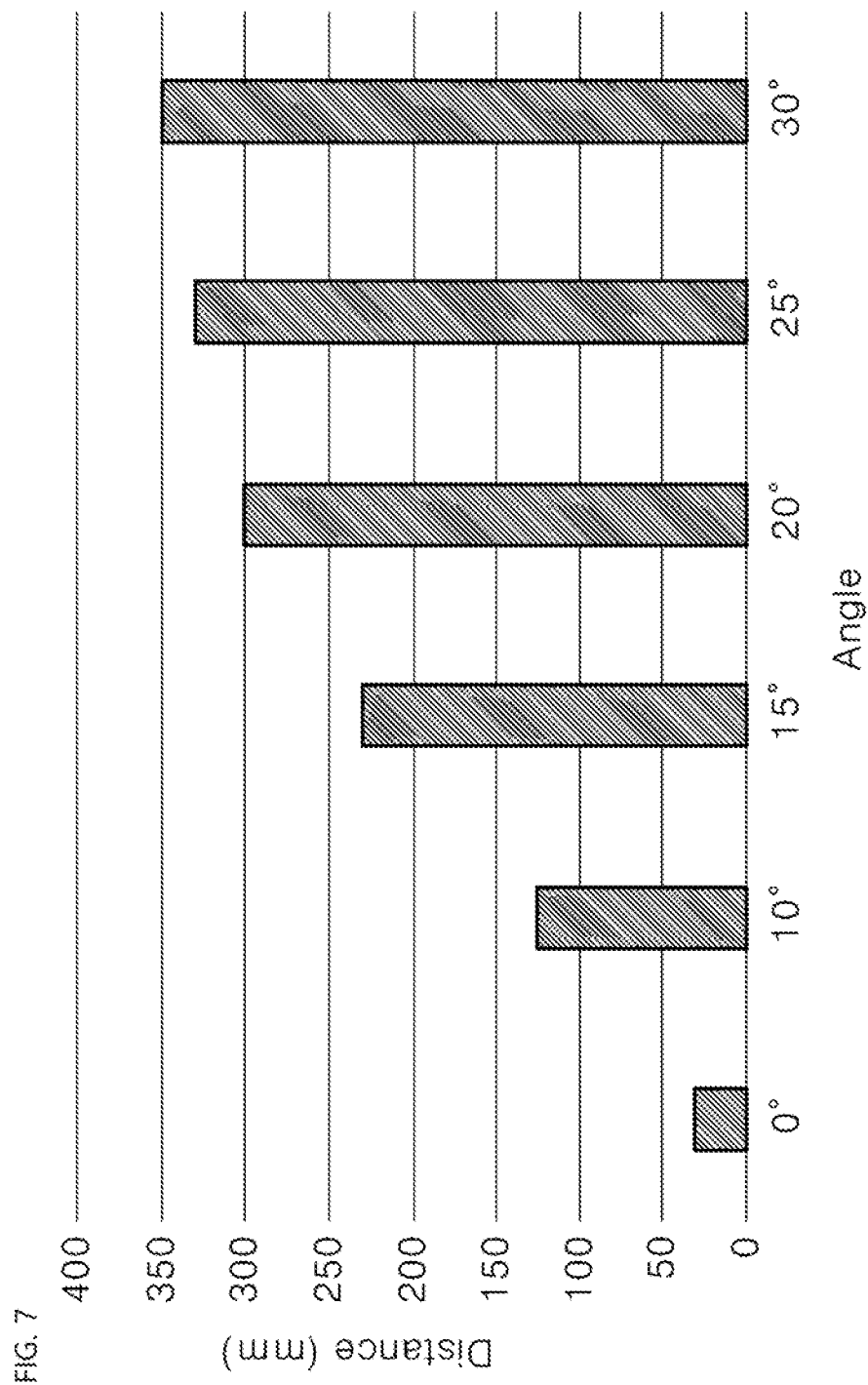
FIG. 7 is a graph illustrating a measurable distance between the storage bin sensor and the storage bin depending on an angle according to one embodiment of the present disclosure.

FIG. 7 illustrates a measurable distance between the storage bin sensor and the storage bin depending on to an angle according to one embodiment of the present disclosure. Measured values of FIG. 7 may be variously varied according to the signal characteristic of the sensor and a size of the storage bin.

The embodiments of the present disclosure reflect these characteristics so that the transmittance part 111 is disposed on the side surface of the storage bin 110 such that an appropriate angle between the storage bin sensor 120 and the storage bin 110 (e.g., ranging from 20 degrees to 30 degrees) is possible.

FIG. 8 illustrates a result of sensing the storage bin in which articles are accommodated according to one embodiment of the present disclosure. This is an example in which a storage bin is disposed as in the diagram 12 of FIG. 3. A diagram 16 shows a state in which articles are accommodated to 50% based on a height of the storage bin 110. A diagram 17 shows a state in which the articles are accommodated to 80% based on the height of the storage bin 110.

Figure 9:
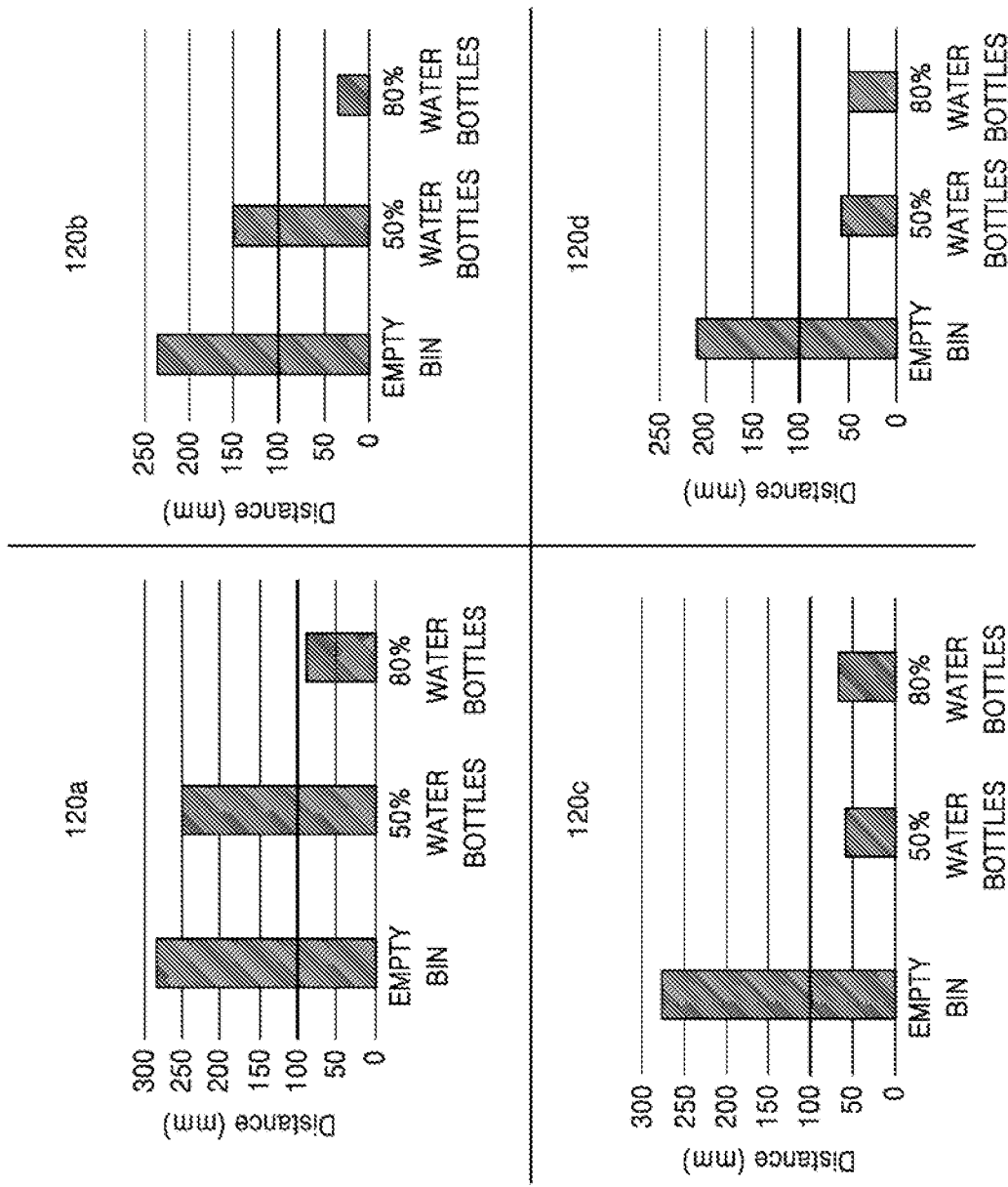
FIG. 9 shows graphs illustrating distances sensed by the storage bin sensor according to one embodiment of the present disclosure.

FIG. 9 illustrates distances sensed by the storage bin sensor according to one embodiment of the present disclosure. FIG. 9 illustrates distances sensed by the storage bin sensors 120a, 120b, 120c, and 120d in cases in which the storage bin 110 is empty, articles (water bottles) are accommodated to 50% based on the height of the storage bin 110, and the articles (water bottles) are accommodated to 80% based on the height of the storage bin 110. The sensed distance is distance information calculated using a time during which a signal output from each sensor is reflected from the articles and then received.

When the articles are not loaded, the signal output from each sensor is reflected on a side surface of the storage bin engagement part 210 outside the storage bin 110. Alternatively, when a material of the side surface of the storage bin engagement part 210 is a material absorbing a signal, since a reflection signal is not present, a separate signal is not input to the sensor. In this case, the controller 150 determines that the articles are not sensed at a height of the sensor.

The sensed distance may be measured in various manners according to the size of the storage bin 110, the angle of the transmittance part 111, a characteristic of the signal output from the sensor, and the presence or absence of the article. The controller 150 checks a loaded state of the articles in the storage bin 110 by combining the sensed distances of the storage bin sensors 120a, 120b, 120c, and 120d and determines whether to collect or maintain the storage bin 110.

For example, when sensed values of all the storage bin sensors 120a, 120b, 120c, and 120d range from 200 mm to 300 mm and the size of the storage bin 110 is 350 mm, the controller 150 may determine that the articles are not loaded.

On the other hand, when measured distances of some storage bin sensors 120c and 120d are very short (50 mm) and measured distances of the remaining storage bin sensors 120a and 120b are long (250 mm, 150 mm, and the like), the controller 150 may determine that articles such as water bottles are loaded at a height level of a half (50%) of the storage bin 110 (heights of the storage bin sensors 120c and 120d or the height h2 of FIG. 3).

Further, when the measured distances of all the storage bin sensors 120a, 120b, 120c, and 120d are very short (100 mm or less), the controller 150 may determine that the articles such as water bottles are loaded at a height level of 80% of the storage bin 110 (heights of the storage bin sensors 120a and 120b or the height h1 of FIG. 3).

Further, only a specific sensor may recognize a very short distance. For example, when a specific sensor senses a short distance, such as a distance of 2×d (twice times of d, i.e., 2d) or 3×d (three times of d, i.e., 3d), based on the distance d between the transmittance part 111 and each of the storage bin sensors 120a, 120b, 120c, and 120d and a distance measured by other sensors is close to a width of the storage bin 110, the controller 150 may determine that a very thin article is closely located to the specific sensor.

For example, when a measured distance of the storage bin sensor 120b is 25 mm (which is a value that is less than 2d) and a measured distance of the storage bin sensor 120a opposite the storage bin sensor 120b is 350 mm (which is the width of the storage bin 110), the controller 150 determines that an error occurs in the storage bin sensor 120b or a small item (e.g., paper, vinyl, or the like) is located very closely to the storage bin sensor 120b. Further, until the measured state of the storage bin sensor 120a opposite the storage bin sensor 120b reaches a state in which the article is sensed, the controller 150 determines that the loaded state of the articles is 80% or less.

In summary, when the distance between the storage bin sensor 120 and the storage bin 110 is d, it is assumed that a first sensor senses an article at a very short distance according to criteria of 2d, 3d, 4d, and the like, and a second sensor opposite the first sensor senses the article at a very long distance (a length of the width of the storage bin 110). Since a very thin article such as paper is located on the side surface of the storage bin 110, the controller 150 determines that the article is not located.

FIG. 10 illustrates a configuration in which a sensor is disposed to have a predetermined angle according to one embodiment of the present disclosure. FIG. 10 shows a configuration in which transmittance parts 111a and 111b are integrally disposed on the side surface of the storage bin 110. The transmittance parts 111a and 111b indicate an area through which the signals output from the storage bin sensors 120a and 120b pass.

A diagram 21 shows a configuration in which a predetermined angle θ is formed between each of the storage bin sensors 120a and 120b and the side surface of the storage bin 110 in a front direction of the storage bin 110. A diagram 22 shows a configuration in which a predetermined angle θ is formed between each of the storage bin sensors 120a and 120b and the side surface of the storage bin 110 in a rear direction of the storage bin 110.

As shown in the diagram 21 or 22, the angle between each of the storage bin sensors 120a and 120b and the storage bin 110 forms a non-parallel angle. For example, the angle ranges from 20 degrees to 30 degrees as one embodiment. Owing to the above-described angle, the signals output from the storage bin sensors 120a and 120b may be prevented from being reflected from the surface of the storage bin 110 and then being input to the storage bin sensors 120a and 120b again.

Hereinbefore, the configurations and arrangements of the storage bin sensor 120 and the storage bin 110 have been described. Hereinafter, a process of determining, by the controller 150, a loaded state of articles in the storage bin 110 or determining whether to replace the storage bin 110 using a sensed value will be described.

Figure 11:
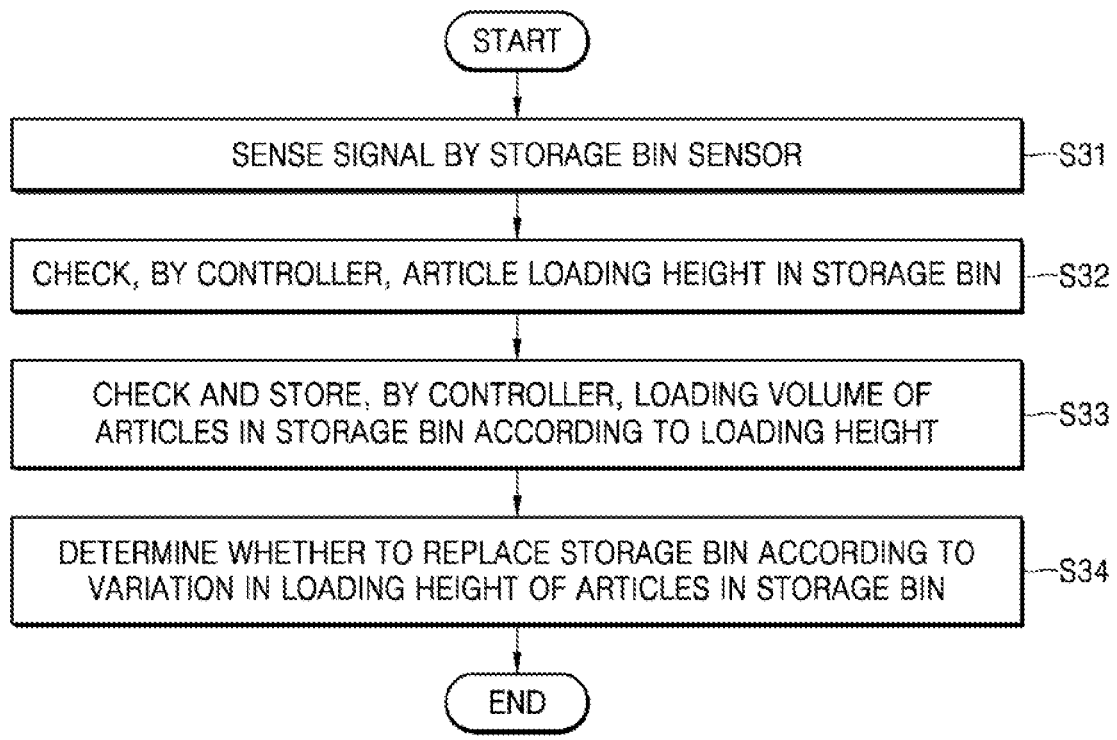
FIG. 11 is a flowchart illustrating a process of checking, by a controller, a loading amount of articles loaded in a storage bin according to one embodiment of the present disclosure.

FIG. 11 illustrates a process of checking, by a controller, a loading amount of articles loaded in a storage bin according to one embodiment of the present disclosure.

The storage bin sensor 120 outputs a signal to the storage bin 110 and senses the reflected signal (S31). The controller 150 checks a height of articles loaded in the storage bin 110 using height information of the storage bin sensor 120 (S32). The controller 150 checks and stores a loading volume of the articles in the storage bin 110 according to the signal (distance information) and a loading height which are sensed by the storage bin sensor 120 (S33).

Thereafter, the controller 150 determines whether to replace the storage bin 110 according to a variation in loading height or volume of the articles in the storage bin 110 (S34). For example, in a state in which the articles are loaded at the height h2 in FIG. 3, the controller 150 determines that the storage bin 110 is not required to be replaced.

On the other hand, in a state in which the articles are loaded at the height h1 in FIG. 3, the controller 150 determines that the storage bin 110 is required to be replaced. When it is determined as being a replacement state, the controller 150 may output the replacement state through the interface 175 or generate a moving path for replacing the storage bin 110.

Figure 12:
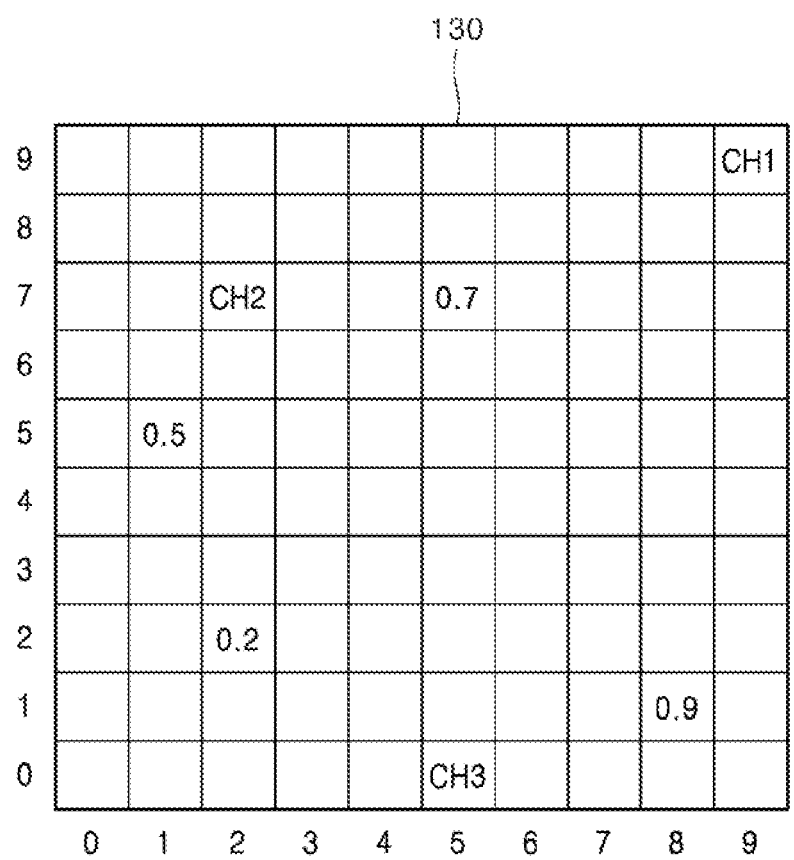
FIG. 12 is a diagram illustrating a configuration of a map storage according to one embodiment of the present disclosure.

FIG. 12 illustrates a configuration of a map storage according to one embodiment of the present disclosure. The robot 100 may further include the map storage 130 which stores position information on a space so as to move in the space. The map storage 130 stores position information on the space in which the robot 100 moves and height variation information of a loaded article generated at a position.

For example, as shown in FIG. 12, the map storage 130 divides the space in which the robot 100 moves into 10×10 cells and stores a height variation (or a volume variation) of the loaded article, which is generated in each cell. A value 0.5 indicating at (1, 5) position among the cells represents a position at which a 50% height variation (or volume variation) occurs.

In FIG. 12, CH1, CH2, and CH3 indicate replacement positions at which the storage bin 110 is replaceable. Accordingly, when the controller 150 determines that the storage bin 110 is ready for replacement using the height of the articles loaded in the storage bin 110, the robot 100 moves to the replacement position.

For example, the controller 150 generates a moving path so as to allow the robot 100 to move to a nearest position among the replacement positions CH1, CH2, and CH3 of the storage bin 110, which are stored in the map storage 130. When the robot 100 is located at a (5, 7) position, the controller 150 generates a moving path to the replacement position CH2. When the robot 100 is located at a (8, 1) position, the controller 150 generates a moving path to the replacement position CH3.

The information of FIG. 12 may be stored each time while the robot 100 moves. For example, as shown in the following Table 1, information on an increased time and information on an increment may be constituted for each time interval. Each cell is indicated by a horizontal axis x and a vertical axis y. FIG. 12 shows an increased portion of the loaded articles during a first time period.

TABLE 1

| (x, y) position | First Time Period | Second Time Period | Third Time Period |
| --- | --- | --- | --- |
| (1, 5) | 0.5 | 0.4 | 0.6 |
| (2, 2) | 0.2 | 0.1 | 0.3 |
| (5, 7) | 0.7 | 0.5 | 0.6 |
| (9, 1) | 0.9 | 0.9 | 0.8 |

The controller 150 may determine a (9, 1) position as an area in which loading of articles always occurs on the basis of the information as shown in Table 1. Further, the controller 150 may determine a (2, 2) position as an area in which the loading of the articles does not occur.

Consequently, the controller 150 may generate a moving path of the robot 100 on the basis of the height of the articles loaded in the storage bin 110 and the height variation information of the loaded article for each position, which is stored in the map storage 130. For example, when the robot 100 is present at the (5, 7) position, the controller 150 may form a moving path such that the robot 100 does not move to the (9, 1) position at which a large amount of articles is always loaded.

Alternatively, when the robot 100 is present at the (5, 7) position, the controller 150 may form a moving path such that the robot 100 moves to the (2, 2) position at which a small amount of articles is loaded.

When the robot 100 is present at the (8, 1) position and the loaded articles reach 0.9, the storage bin 110 should be replaced as soon as possible. Further, the (8, 1) position has a tendency in that a speed of loading of articles is fast (see Table 1).

In this case, the communication part 140 of the robot 100 transmits a message requesting adjacent other robots to move to the (8, 1) position at which the robot 100 is currently located. When any one among adjacent other robots receiving the message is provided with the storage bin 110 which is empty or has a small loading amount, the robot may move to the (8, 1) position to cope with loading of articles without discomfort to a user.

Figure 13:
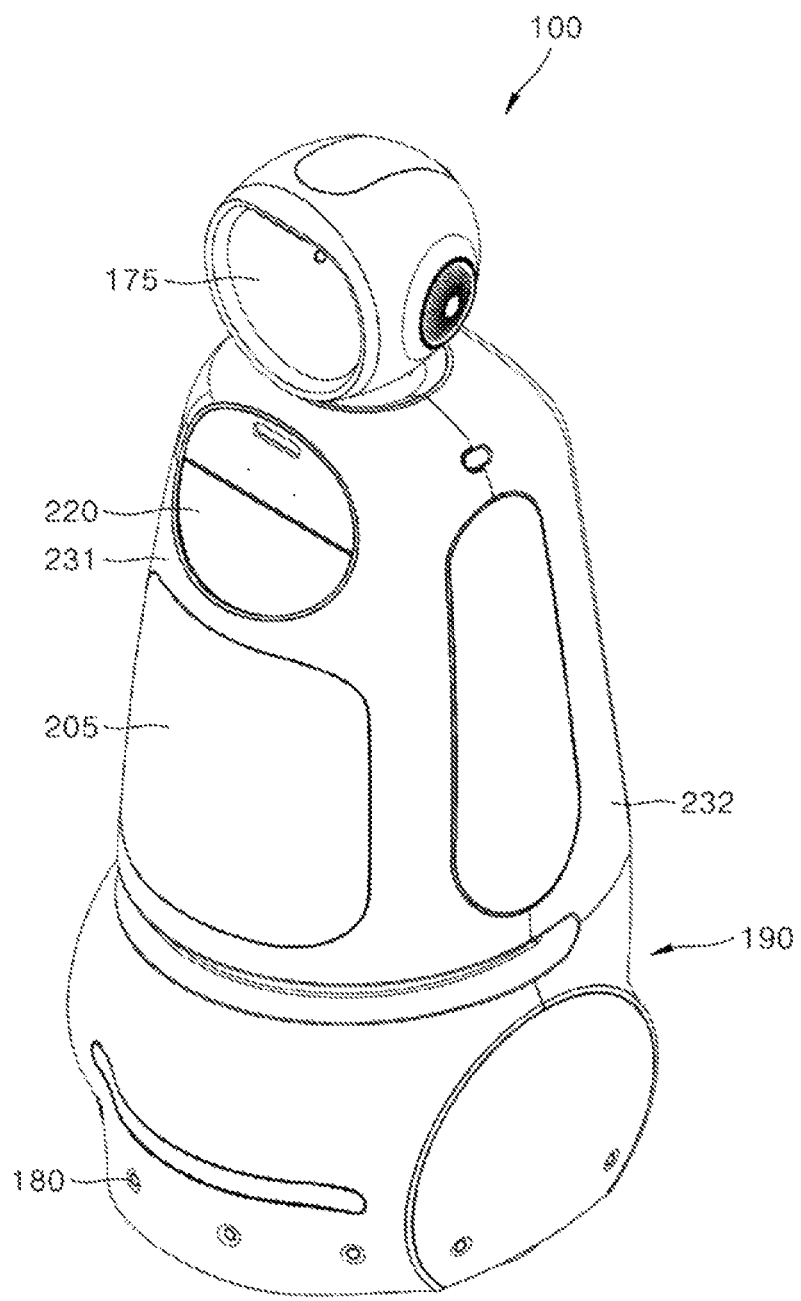
FIGS. 13 and 14 are diagrams illustrating an engagement of a robot and a storage bin according to another embodiment of the present disclosure.
Figure 14:
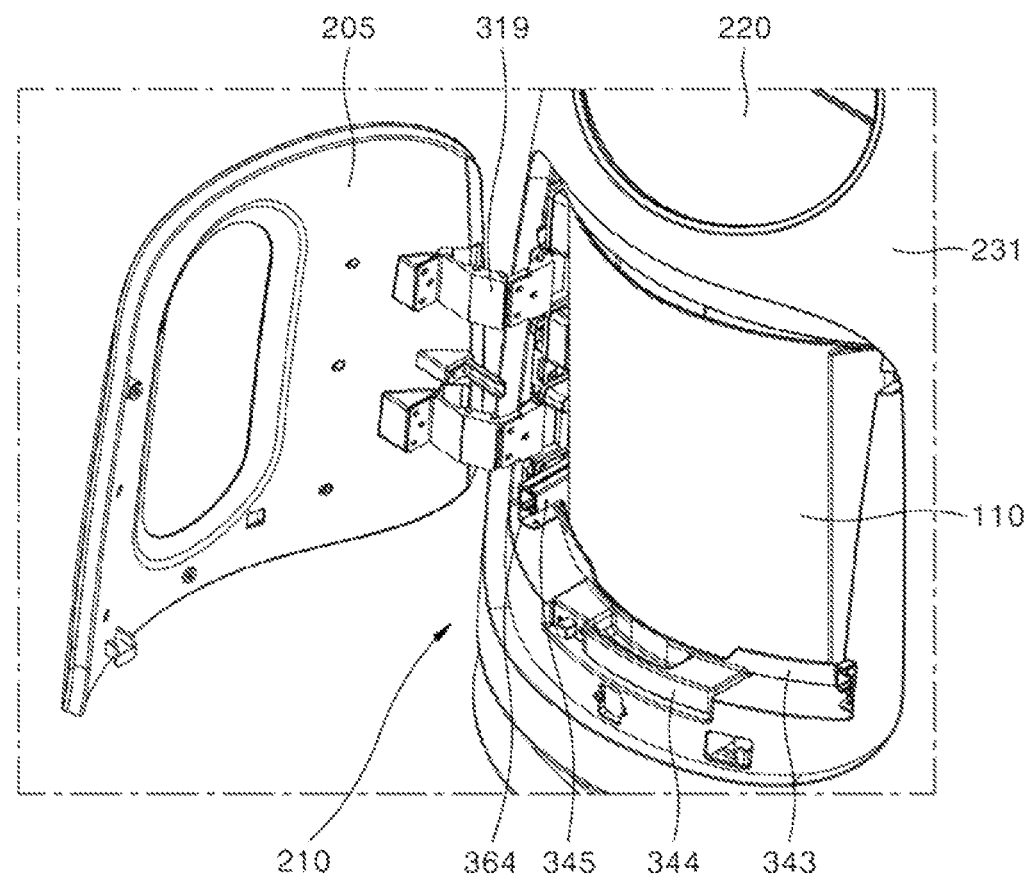

FIGS. 13 and 14 illustrate an engagement of a robot and a storage bin according to another embodiment of the present disclosure. Referring to FIG. 13, a plurality of parts is disposed on an upper portion of the robot 100 to provide a road guidance, airport information, and a wastebasket function to a user. For example, the interface 175, an input part 220 for putting an article into the storage bin 110, and the door 205 for opening or closing the storage bin engagement part 210 so as to take out or insert the storage bin 110 are disposed in the upper portion of the robot 100. The moving part 190 and the obstacle sensor 180 are disposed in a lower portion of the robot 100.

The robot 100 includes a front case 231 constituting a front appearance thereof and a rear case 232 constituting a rear appearance thereof.

The input part 220 serves as an inlet for moving garbage or articles into a storage bin (not shown) disposed in the robot 100. To this end, the input part 220 may be located above the storage bin 110. That is, the input part 220 is disposed above the door 205. The articles, which are put into through the input part 220, fall down and are moved to the storage bin 110 disposed in the robot 100.

The input part 220 is formed on one side of the robot 100. The input part 220 may be installed on a front surface of the robot 100. Further, the input part 220 includes a configuration of being opened only when a user puts the articles into the input part 220 and then closed again. Alternatively, the robot 100 may sense a person therearound and automatically open or close the input part 220.

Referring to FIG. 14, the storage bin 110 is in a state of being engaged with the robot 100 and the door 205 is in a state of being opened. The door 205 is coupled to the front case 231 and coupled to a hinge connector 319 installed at an inner side of the storage bin engagement part 210.

The storage bin engagement part 210 may be selectively shielded due to the opening and closing of the door 205.

When the door 205 is opened, the storage bin 110 is exposed to the outside, and the user may separate the storage bin 110.

A seating part 343 seats the storage bin 110 on the storage bin engagement part 210. Further, the seating part 343 further includes a handle 344 for easily taking the storage bin 110 out. When the handle 344 is pulled, the storage bin 110 is moved to the outside along a rail assembly 364. A bracket 345 and the rail assembly 364 are coupled such that the storage bin 110 may be easily moved.

Even though all components configuring the embodiments of the present disclosure are described to be combined as one unit or to operate as a combination thereof, the present disclosure is not limited to these embodiments. Alternatively, all of the components may operate by being selectively coupled to one or more within the scope of the present disclosure. Further, all of the components may each be implemented in single independent hardware. However, a part or an entirety of each of the components may be selectively combined to be implemented as a computer program having a program module which performs some or all of functions combined in one or a plurality of pieces of hardware. Codes and code segments constituting the computer program may be easily deduced by those skilled in the art to which the present disclosure pertains. The computer program may be stored in a computer-readable storage medium and may be read and executed by a computer, thereby realizing the embodiments of the present disclosure. The storage medium of the computer program includes a magnetic recording medium, an optical recording medium, and a storage medium including a semiconductor recording element. Further, the computer program implementing the embodiments of the present disclosure includes a program module which is transmitted in real time or at regular intervals through an external device.

When the embodiments of the present disclosure are applied, since a robot senses an amount of objects in a storage bin coupled to the robot in real time or at regular intervals, the robot can perform a subsequent action according to a loaded state in the storage bin.

Further, when the embodiments of the present disclosure are applied, even when various objects are loaded in the storage bin, the robot can check the loaded state by arranging a sensor for sensing an amount of objects in the storage bin outside the storage bin.

Further, when the embodiments of the present disclosure are applied, the robot can generate a moving path thereof and efficiently manage the storage bin by storing the loaded state in the storage bin, which is sensed by the robot in real time or at regular intervals, in a map.

The effects of the present disclosure are not limited to the above-described effects, and those skilled in the art to which the present disclosure pertains can easily derive various effects of the present disclosure from the configuration thereof.

While the present disclosure has been particularly shown and described with reference to exemplary embodiments thereof, it should be noted that many alterations and modifications will be made by those skilled in the art. Therefore, it may be understood that such changes and modifications are intended to be included within the spirit and scope of the present disclosure as long as not departing from the scope of the present disclosure.

What is claimed is:

1. A robot to accommodate articles, the robot comprising:
a moving part to move the robot;
an obstacle sensor on the robot to sense an object located outside of the robot;
a storage bin located in the robot to receive articles from outside of the robot;
storage bin sensors disposed outside the storage bin, the storage bin sensors arranged to sense the articles received in the storage bin, the storage bin sensors being arranged at a non-parallel angle relative to a side surface of the storage bin; and
a controller configured to:
move the robot by controlling the obstacle sensor and the moving part; and
determine whether to replace the storage bin or remove the articles from the storage bin according to a loading height of the articles in the storage bin sensed by the storage bin sensors.

2. The robot of claim 1, further comprising a transmittance part at the side surface of the storage bin opposite each of the storage bin sensors such that signals output from the storage bin sensors opposite the transmittance part pass through the transmittance part into the storage bin.

3. The robot of claim 2, wherein the angle of each storage bin sensor relative to the side surface is in a range of 20 degrees to 30 degrees.

4. The robot of claim 2, wherein the transmittance part is transparent and a remainder of the side surface is opaque.

5. The robot of claim 1, further comprising a storage bin engagement part recessed in the robot to receive the storage bin in the robot, the storage bin engagement part having a base surface to support the storage bin,
wherein the storage bin sensors include:
a first storage bin sensor located at a first height in a direction normal to the base surface; and
a second storage bin sensor located at a second height in the direction normal to the base surface, the first height being greater than the second height, and
wherein the controller is further configured to, after the storage bin is received in the storage bin engagement part, determine a loaded state of the articles received in the storage bin using signals sensed by the first storage bin sensor and the second storage bin sensor.

6. The robot of claim 5, wherein the storage bin sensors include:
a third storage bin sensor located directly opposite the first storage bin sensor at the first height in the direction normal to the base surface; and
a fourth storage bin sensor located directly opposite the second storage bin at the second height in the direction normal to the base surface.

7. The robot of claim 5, wherein the storage bin sensors include:
a third storage bin sensor located opposite the first storage bin sensor at a third height in the direction normal to the base surface; and
a fourth storage bin sensor located opposite the second storage bin sensor at a fourth height in the direction normal to the base surface, and
wherein the third height is less than the first height and greater than the second height, and
wherein the fourth height is less than the second height.

8. The robot of claim 1, wherein the controller is further configured to:
periodically determine and store a loading amount of the articles received in the storage bin using signals sensed by the storage bin sensors; and
determine whether to replace the storage bin or remove the articles from the storage bin according to a variation in the loading amount of the articles received in the storage bin.

9. The robot of claim 8, wherein the variation in the loading amount is determined by the controller based on a variation in the loading height of the articles sensed by the storage bin sensors.

10. The robot of claim 1, further comprising a map storage configured to store position information of a space in which the robot moves and height variation information of the received articles generated at each position at which the robot moves in the space,
wherein the controller is further configured to generate a moving path of the robot based on the loading height of the articles received in the storage bin and the height variation information of the received articles for each position stored in the map storage.

11. The robot of claim 10, wherein the controller is further configured to, when the controller determines that the storage bin is ready to be replaced using the loading height of the articles received in the storage bin, generate the moving path to cause the robot to move to a nearest position among storage bin replacement positions stored in the map storage.

12. The robot of claim 11, further comprising a communicator configured to transmit and receive information to and from one or more other robots,
wherein the communicator is configured to transmit a message requesting movement of at least one of the one or more other robots located in adjacent positions to a current position of the robot.

13. A method of sensing a loaded state of articles received in a robot, the method comprising:
sensing, by storage bin sensors of the robot, signals output to a storage bin of the robot, the storage bin sensors being arranged at a non-parallel angle relative to a side surface of the storage bin;

determining, by a controller of the robot, a loading height of the articles received in the storage bin on the basis of the sensed signals;

determining and storing, by the controller, a loading volume of the articles received in the storage bin according to the loading height of the articles received in the storage bin;

determining, by the controller, whether to replace the storage bin or remove the articles from the storage bin; and generating, by the controller, a moving path for the robot to a location where replacement of the storage bin or removal of the articles from the storage bin is performed.

14. The method of claim 13, wherein the storage bin includes a transmittance part at the side surface of the storage bin opposite each of the storage bin sensors such that signals output from the storage bin sensors opposite the transmittance part pass through the transmittance part into the storage bin.

15. The method of claim 13, wherein the robot includes a storage bin engagement part recessed in the robot to receive the storage bin in the robot, the storage bin engagement part having a base surface to support the storage bin, wherein the storage bin sensors include:
a first storage bin sensor located at a first height in a direction normal to the base surface; and
a second storage bin sensor located at a second height in the direction normal to the base surface, the first height being greater than the second height, and wherein the method further includes:
after the storage bin is received in the storage bin engagement part, receiving, by the controller, signals sensed by the first storage bin sensor and the second storage bin sensor; and
determining, by the controller, a loaded state of the articles received in the storage bin based on the signals sensed by the first storage bin sensor and the second storage bin sensor.

16. The method of claim 13, further comprising:
periodically determining and storing, by the controller, a loading amount of the articles received in the storage bin by the signals sensed by the storage bin sensors; and
determining, by the controller, whether to replace the storage bin or remove articles from the storage bin according to a variation in the loading amount of the articles received in the storage bin.

17. The method of claim 16, where the variation in the loading amount of the articles by the controller is based on a variation in the loading height of the articles received in the storage bin sensed by the storage bin sensors.

18. The method of claim 13, wherein the robot includes a map storage configured to store position information of a space in which the robot moves and height variation information of the received articles generated at each position at which the robot moves in the space, and wherein the method further includes generating, by the controller, a moving path of the robot based on the loading height of the articles received in the storage bin and the height variation information of the received articles for each position stored in the map storage.

19. The method of claim 18, further comprising:
determining, by the controller, that the storage bin is ready to be replaced using the loading height of the articles received in the storage bin; and
generating, by the controller, a moving path to cause the robot to move to a nearest position among storage bin replacement positions stored in the map storage.

20. The method of claim 19, wherein the robot further includes a communicator configured to transmit and receive information to and from one or more other robots, and wherein the method further includes transmitting, by the communicator, a message requesting movement of at least one of the one or more other robots located in adjacent positions to a current position of the robot.

* * * * *